United States Patent
Li et al.

(10) Patent No.: US 11,044,629 B2
(45) Date of Patent: Jun. 22, 2021

(54) WIRELESS COMMUNICATION METHOD, USER EQUIPMENT, ACCESS NETWORK DEVICE, AND CORE NETWORK DEVICE

(71) Applicant: Huawei Technologies Co., Ltd., Guangdong (CN)

(72) Inventors: Hong Li, Shanghai (CN); Feng Han, Shanghai (CN); Yinghao Jin, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/403,045

(22) Filed: May 3, 2019

(65) Prior Publication Data

US 2019/0261212 A1   Aug. 22, 2019

Related U.S. Application Data

(63) Continuation of application No. PCT/CN2017/105537, filed on Oct. 10, 2017.

(30) Foreign Application Priority Data

Nov. 4, 2016   (CN) .......................... 201610976971.9

(51) Int. Cl.
*H04W 28/02*   (2009.01)
*H04W 72/04*   (2009.01)
(Continued)

(52) U.S. Cl.
CPC ... *H04W 28/0268* (2013.01); *H04W 28/0252* (2013.01); *H04W 72/0413* (2013.01); *H04W 72/085* (2013.01); *H04W 72/12* (2013.01)

(58) Field of Classification Search
CPC ......... H04W 28/0252; H04W 28/0268; H04W 72/0413; H04W 72/085; H04W 72/12;
(Continued)

(56) References Cited

U.S. PATENT DOCUMENTS

2015/0063101 A1   3/2015   Touati et al.
2020/0275302 A1*  8/2020   Youn ................ H04W 28/0268

FOREIGN PATENT DOCUMENTS

CN   102791007 A   11/2012
CN   103096314 A   5/2013
(Continued)

OTHER PUBLICATIONS

Huawei, HiSilicon, Packet Filter with Wildcards and Update the Interim Agreement on Reflective Qos, SA WG2 #117, Oct. 17-21, 2016, Kaohsiung, S2-16xxxx, Taiwan, 11 pages.
(Continued)

*Primary Examiner* — Thomas R Cairns
(74) *Attorney, Agent, or Firm* — Slater Matsil, LLP (57) ABSTRACT

A method includes receiving, by user equipment, downlink data from a first bearer, where a reflective quality of service QoS attribute of the first bearer is Support; when the user equipment needs to send, to an access network device, uplink data corresponding to the downlink data, determining, by the user equipment, a second bearer, where QoS information of the second bearer is determined based on QoS information of the first bearer; and sending, by the user equipment, the uplink data by using the second bearer.

14 Claims, 6 Drawing Sheets

(51) Int. Cl.
*H04W 72/08* (2009.01)
*H04W 72/12* (2009.01)

(58) Field of Classification Search
CPC ......... H04W 4/08; H04W 8/20; H04W 16/14; H04W 28/0257–0263; H04W 28/0236; H04W 28/0263; H04W 28/065; H04W 28/10; H04W 28/12; H04W 28/14; H04W 28/24; H04W 52/0216; H04W 72/04; H04W 72/1205–1294; H04W 72/1221; H04W 72/1226; H04W 72/1231–1236; H04W 72/1252; H04W 72/14; H04W 36/0094; H04W 74/002; H04W 76/28; H04W 88/06; H04W 88/10; G06F 9/4881; G06F 9/5011; H04L 1/0001; H04L 47/10
See application file for complete search history.

(56) References Cited

FOREIGN PATENT DOCUMENTS

| CN | 105766022 A | 7/2016 |
|---|---|---|
| EP | 2916613 A1 | 9/2015 |

OTHER PUBLICATIONS

"3rd Generation Partnership Project; Technical Specification Group Services and System Aspects; Study on Architecture for Next Generation System (Release 14)," 3GPP TR 23.799 V0.8.0, Sep. 2016, 423 pages.

"TS 23.139: Correction of Procedures for WLAN access," Source: Huawei, Hisilicon, LG Electronics, Document for: Approval, Agenda Item: 9.3, Work Item / Release: BBAI/Rel-11, 3GPP TSG SA WG2 Meeting #86, TD S2-113282, Naantali, Finland, Jul. 11-15, 2011, 18 pages.

"DRB Mapping in UL," Agenda Item: 9.2.1.2, Source: Nokia, Alcatel-Lucent Shanghai Bell, WID/SID: FS_NR_newRAT—Release 14, Document for: Discussion and Decision, 3GPP TSG-RAN WG2 Meeting #95bis, R2-166162, Kaohsiung, Taiwan, Oct. 10-14, 2016, 4 pages.

"QoS Framework for NR," Agenda Item: 9.2.1.2, Source: Ericsson, Document for: Discussion and Decision, 3GPP TSG-RAN WG2 #95bis, Tdoc R2-166801, Kaohsiung, Taiwan, Oct. 10-14, 2016, 4 pages.

"Packet Filter with Wildcards and Update the Interim Agreement on Reflective Qos," Source: Huawei, HiSilicon, Document for: Approval, Agenda Item: 6.10.2, Work Item/Release: FS_NexGen/Rel-14, SA WG2 Meeting #117, S2-166294, Kaohsiung, Taiwan, Oct. 17-21, 2016, 6 pages.

* cited by examiner

WIRELESS COMMUNICATION METHOD, USER EQUIPMENT, ACCESS NETWORK DEVICE, AND CORE NETWORK DEVICE

CROSS-REFERENCE TO RELATED APPLICATIONS

This application is a continuation of International Application No. PCT/CN2017/105537 filed on Oct. 10, 2017, which claims priority to Chinese Patent Application No. 201610976971.9 filed on Nov. 4, 2016. The disclosures of the aforementioned applications are hereby incorporated by reference in their entireties.

TECHNICAL FIELD

Embodiments of the present application relate to the field of wireless network communications, and in particular, to a wireless communication method, user equipment, an access network device, a core network device, and a network system.

BACKGROUND

Quality of service (QoS) management in an existing LTE system implements end-to-end QoS assurance based on bearers. In the LTE system, a bearer is a logical set of one or more service data flows between user equipment (UE) and a packet data network gateway (P-GW). Same packet forwarding processing (such as processing according to a scheduling policy, a queuing management policy, a rate adjustment policy, or an RLC configuration) is performed on service data flows mapped to a same evolved packet system (EPS) bearer. In the LTE system, QoS assurance from the P-GW to the UE may be implemented by using several bearers, including: an S5/S8 bearer between the P-GW and a serving gateway (S-GW), an S1 bearer between the S-GW and an evolved NodeB (eNB), and a radio bearer between the eNB and the UE. The S5/S8 bearer, the S1 bearer, and the radio bearer are collectively referred to as an EPS bearer, where attributes of the EPS bearer are provided by the P-GW. Attributes of a bearer correspond to one QoS processing manner, and a same data packet forwarding mode is used for data on a same bearer. In a downlink direction, the P-GW maps a service data flow to an EPS bearer. On all the S5/S8 bearer, the S1 bearer, and the radio bearer, a QoS requirement of a service is ensured based on the attributes of the EPS bearer. In the existing LTE system, QoS control of data transmission is performed at a bearer-based granularity, and a plurality of Internet Protocol (IP) flows are mapped to one EPS bearer. The EPS bearer is the smallest unit for QoS control. In other words, QoS is not differentiated for data flows on a same EPS bearer. A 1:1 mapping manner is used for the radio bearer, the S1 bearer, and the S5/S8 bearer between the UE and the P-GW.

In the existing LTE system, QoS control of data transmission is performed based on an EPS bearer-based granularity, and a plurality of IP flows are mapped to one EPS bearer. The EPS bearer is the smallest unit, in an EPS, used for bear-level QoS control. In other words, QoS is not differentiated for data flows on a same EPS bearer. A 1:1 mapping manner is used for an air interface bearer, an AN bearer, and a CN bearer between the UE and the P-GW. If a new data flow needs to be transmitted and the data flow cannot be mapped to an existing data bearer, a dedicated EPS data bearer needs to be set up.

In the LTE system, for uplink data transmission, a data flow is also mapped to a bearer in a bearer mapping manner. A network delivers the mapping manner to the UE in a form of a template by using signaling. In addition, the network also delivers service-related QoS information, such as a granted QoS class, to the UE by using signaling. The UE maps the data flow by using the template delivered by the network. If there is no appropriate bearer, the UE requests, by using signaling, the network to set up a bearer.

During uplink data transmission, signaling exchange needs to be performed for a plurality of times between the UE and the network (including a core network and an access network). This relates to a relatively large quantity of network function units, and causes relatively large quantity of signaling overheads and a relatively high delay.

SUMMARY

Embodiments of the present application provide a wireless communication method, user equipment, an access network device, and a network system, so as to reduce a delay.

According to a first aspect, an embodiment of the present application provides a wireless communication method, including: receiving, by user equipment, downlink data from a first bearer, where a reflective quality of service QoS attribute of the first bearer is Support; when the user equipment needs to send, to an access network device, uplink data corresponding to the downlink data, determining, by the user equipment, a second bearer, where QoS information of the second bearer is determined based on QoS information of the first bearer; and sending, by the user equipment, the uplink data by using the second bearer.

In this embodiment of the present application, the user equipment receives the downlink data from the first bearer, and if the reflective quality of service QoS attribute of the first bearer is Support, may directly determine the QoS information of the second bearer based on the QoS information of the first bearer when transmitting the uplink data corresponding to the downlink data, to avoid obtaining QoS information by using signaling, and reduce signaling overheads and a delay. In addition, during uplink data transmission and corresponding downlink data transmission, QoS information of a bearer used in the downlink data transmission is determined based on QoS information of a bearer used in the uplink data transmission, to ensure service experience of a user.

In a possible design, the second bearer is the same as the first bearer, or the second bearer is set up after the user equipment receives the downlink data. If the second bearer is the same as the first bearer, when the uplink data corresponding to the downlink data is transmitted, the first bearer may be directly used to transmit the uplink data, thereby avoiding a process of re-setting up a bearer, and reducing signaling overheads and a delay. If the second bearer is set up after the user equipment receives the downlink data, the user equipment may set up the second bearer based on a characteristic of the uplink data. This is also applicable to a scenario in which independent bearers need to be used in uplink transmission and downlink transmission, and a scenario in which the first bearer cannot be used to transmit the uplink data.

In a possible design, before the receiving, by the user equipment, the downlink data from the first bearer, the method further includes: receiving, by the user equipment, the QoS information of the first bearer, where the QoS information of the first bearer includes a QoS class supported by the first bearer and the reflective QoS attribute of the first bearer.

The user equipment obtains the QoS information of the first bearer in advance, and may directly determine the QoS information of the second bearer based on the QoS information of the first bearer when receiving the downlink data from the first bearer; and signaling exchange is not needed in obtaining the QoS information of the second bearer, thereby reducing signaling exchange and a delay. In addition, if the user equipment needs to directly transmit uplink data, the data may be mapped to an appropriate bearer, to reduce a delay.

In a possible design, the downlink data includes a bearer quality of service indicator BQI of the first bearer, where the BQI of the first bearer includes the QoS information of the first bearer. The user equipment may determine, based on the BQI, a bearer that the user equipment should use. In addition, a QoS indication of a bearer is sent through data transmission, to reduce signaling overheads that would otherwise be caused by sending the indication by using signaling.

According to a second aspect, an embodiment of the present invention provides a wireless communication method, including: sending, by an access network device, first downlink data by using a first bearer, where a reflective quality of service QoS attribute of the first bearer is Support; and receiving, by the access network device by using a second bearer, first uplink data corresponding to the first downlink data, where QoS information of the second bearer is determined based on QoS information of the first bearer.

In a possible design, the second bearer is the same as the first bearer, or the second bearer is set up after the access network device receives the downlink data.

In a possible design, before the sending, by the access network device, the first downlink data by using the first bearer, the method further includes: receiving, by the access network device, the QoS information of the first bearer, where the QoS information of the first bearer includes a QoS class supported by the first bearer and the reflective QoS attribute of the first bearer. After the access network device obtains the QoS information of the first bearer, data can be conveniently mapped to a bearer.

In a possible design, the first downlink data includes a bearer quality of service indicator BQI of the first bearer, where the BQI of the first bearer includes the QoS information of the first bearer.

In a possible design, before the sending, by the access network device, the first downlink data by using the first bearer, the method further includes: receiving, by the access network device, second downlink data from a core network device in a form of a flow, where the second downlink data includes a reflective QoS indication; obtaining, by the access network device, the first downlink data based on the second downlink data, where the first downlink data does not include a reflective QoS indication; and mapping, by the access network device, the first downlink data to the first bearer. The first downlink data mapped by the access network device to the first bearer does not need to include a reflective QoS indication. This can reduce data transmission overheads on an air interface.

In a possible design, after the receiving, by the access network device by using the second bearer, the first uplink data, the method further includes: demapping, by the access network device, the first uplink data to a data flow; obtaining, by the access network device, second uplink data based on the first uplink data, where the second uplink data includes a flow priority indicator FPI; and sending, by the access network device, the second uplink data to the core network device in a form of a flow. This technical solution is especially applicable to a scenario in which a core network performs transmission by using a flow.

In a possible design, the access network device is an access network user plane device; and after the receiving, by the access network device, the first downlink data in a form of a flow, and before the mapping, by the access network device, the first downlink data to the first bearer, the method further includes: sending, by the access network user plane device, a bearer setup request to an access network control plane device; and receiving, by the access network user plane device, a bearer setup response, where the bearer setup response includes an identifier of the first bearer, the QoS information of the first bearer, and the reflective QoS attribute of the first bearer. For bearer setup during downlink data transmission, a corresponding bearer may be set up with reference to a characteristic of the first downlink data, and QoS information does not need to be obtained by using separate signaling.

In a possible design, the access network device sends, to the UE by using the first bearer, third downlink data related to the first downlink data. The bearer set up during the transmission of the first downlink data may be retained for use in subsequent transmission of the related third downlink data, thereby avoiding repeated bearer setup.

According to a third aspect, an embodiment of the present application provides a wireless communication method, including: sending, by a core network device, first downlink data by using a first bearer, where a reflective quality of service QoS attribute of the first bearer is Support; and receiving, by the core network device by using a second bearer, first uplink data corresponding to the first downlink data, where QoS information of the second bearer is determined based on QoS information of the first bearer.

In a possible design, the second bearer is the same as the first bearer, or the second bearer is set up after the core network device receives the downlink data.

In a possible design, before the sending, by the core network device, the first downlink data by using the first bearer, the method further includes: receiving, by the core network device, the QoS information of the first bearer, where the QoS information of the first bearer includes a QoS class supported by the first bearer and the reflective QoS attribute of the first bearer.

In a possible design, the first downlink data includes a bearer quality of service indicator BQI of the first bearer, where the BQI of the first bearer includes the QoS information of the first bearer.

According to a fourth aspect, an embodiment of the present application provides user equipment, where the user equipment has a function of implementing behavior of the user equipment in the foregoing methods. The function may be implemented by hardware, or may be implemented by hardware executing corresponding software. The hardware or software includes one or more modules corresponding to the function. The module may be software and/or hardware.

In a possible design, the user equipment includes a transmitter, a receiver, and a processor. The receiver is configured to receive downlink data from a first bearer, where a reflective quality of service QoS attribute of the first bearer is Support. The processor is configured to: when uplink data corresponding to the downlink data needs to be sent to an access network device, determine a second bearer, where QoS information of the second bearer is determined based on QoS information of the first bearer. The transmitter is configured to send the uplink data by using the second bearer.

In a possible design, the receiver is further configured to receive the QoS information of the first bearer, where the QoS information of the first bearer includes a QoS class supported by the first bearer and the reflective QoS attribute of the first bearer.

According to a fifth aspect, an embodiment of the present application provides an access network device, where the access network device has a function of implementing behavior of the access network device in the foregoing methods. The function may be implemented by hardware, or may be implemented by hardware executing corresponding software. The hardware or software includes one or more modules corresponding to the function. The module may be software and/or hardware.

In a possible design, the access network device includes a transmitter and a receiver. The transmitter is configured to send first downlink data by using a first bearer, where a reflective quality of service QoS attribute of the first bearer is Support. The receiver is configured to receive, by using a second bearer, first uplink data corresponding to the downlink data, where QoS information of the second bearer is determined based on QoS information of the first bearer.

In a possible design, the receiver is further configured to receive the QoS information of the first bearer, where the QoS information of the first bearer includes a QoS class supported by the first bearer and the reflective QoS attribute of the first bearer.

In a possible design, the receiver is further configured to receive second downlink data from a core network device in a form of a flow, where the second downlink data includes a reflective QoS indication; and the access network device further includes a processor. The processor is configured to: obtain the first downlink data based on the second downlink data, where the first downlink data does not include a reflective QoS indication; and map the first downlink data to the first bearer.

In a possible design, the processor is further configured to demap the first uplink data to a data flow, and obtain second uplink data based on the first uplink data, where the second uplink data includes a flow priority indicator FPI; and the transmitter is further configured to send the second uplink data to the core network device in a form of a flow.

In a possible design, the access network device is an access network user plane device; the transmitter is further configured to send a bearer setup request to an access network control plane device; and the receiver is further configured to receive a bearer setup response, where the bearer setup response includes an identifier of the first bearer, the QoS information of the first bearer, and the reflective QoS attribute of the first bearer.

In a possible design, the transmitter is further configured to send, to the UE by using the first bearer, third downlink data related to the first downlink data.

According to a sixth aspect, an embodiment of the present application provides a core network device, where the core network device has a function of implementing behavior of the core network device in the foregoing methods. The function may be implemented by hardware, or may be implemented by hardware executing corresponding software. The hardware or software includes one or more modules corresponding to the function. The module may be software and/or hardware.

In a possible design, the core network device includes a transmitter and a receiver. The transmitter is configured to send first downlink data by using a first bearer, where a reflective quality of service QoS attribute of the first bearer is Support. The receiver is configured to receive, by using a second bearer, first uplink data corresponding to the downlink data, where QoS information of the second bearer is determined based on QoS information of the first bearer.

In a possible design, the receiver is further configured to receive the QoS information of the first bearer, where the QoS information of the first bearer includes a QoS class supported by the first bearer and the reflective QoS attribute of the first bearer.

According to a seventh aspect, an embodiment of the present application provides a communications system, where the system includes the user equipment and the access network device in the foregoing aspects, or the system includes the access network device and the core network device in the foregoing aspects, or the system includes the user equipment, the access network device, and the core network device in the foregoing aspects.

According to an eighth aspect, an embodiment of the present application provides a computer storage medium, configured to store computer software instructions used by the foregoing user equipment, where the computer software instructions include a program designed to perform the foregoing aspects.

According to a ninth aspect, an embodiment of the present application provides a computer storage medium, configured to store computer software instructions used by the foregoing access network device, where the computer software instructions include a program designed to perform the foregoing aspects.

According to a tenth aspect, an embodiment of the present application provides a computer storage medium, configured to store computer software instructions used by the foregoing core network device, where the computer software instructions include a program designed to perform the foregoing aspects.

BRIEF DESCRIPTION OF THE DRAWINGS

To describe the technical solutions in the embodiments of the present application more clearly, the following briefly introduces the accompanying drawings required for describing the embodiments. Apparently, the accompanying drawings in the following descriptions show merely some embodiments of the present application, and a person of ordinary skill in the art may derive other drawings from these accompanying drawings without creative efforts.

DETAILED DESCRIPTION

The following clearly describes the technical solutions in the embodiments of the present application with reference to the accompanying drawings in the embodiments of the present application. Apparently, the described embodiments are merely some but not all of the embodiments of the present application. The following several specific embodiments may be combined with one another, and a same or similar concept or process may not be described repeatedly in some embodiments. All other embodiments obtained by a person of ordinary skill in the art based on the embodiments of the present application without creative efforts shall fall within the protection scope of the embodiments of the present application.

In this application, the term "example" is used to represent "giving an example, an illustration, or a description". Any embodiment described as an "example" in this application is not necessarily construed as more advantageous than other embodiments. The following descriptions are provided so that any person skilled in the art can implement and use the embodiments of the present application. In the following descriptions, details are listed for a purpose of explanation. It should be understood that, a person of ordinary skill in the art may be aware that the embodiments of the present application can also be implemented without using these specific details. In other examples, well-known structures and processes are not described in detail, so as to avoid unnecessary details that would otherwise make descriptions of the embodiments of the present application obscure. Therefore, the embodiments of the present application are not limited to the shown embodiments, but are consistent with a widest scope conforming to the principles and the features disclosed in this application.

In the specification, claims, and accompanying drawings of the embodiments of the present application, the terms "first", "second", "third", and the like are intended to distinguish between similar objects but do not necessarily indicate a specific order or sequence. It should be understood that the data termed in such a way is interchangeable in appropriate circumstances so that the embodiments of the present application described herein can be implemented in an order other than the order illustrated or described herein. In addition, the terms "including", "having", and any variants thereof are intended to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

The terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

The term "connection" in this specification may be a direct connection or an indirect connection. A "function entity" is an entity for implementing a function, and includes a corresponding hardware structure and/or software module for performing the function.

The term "bearer" in this specification is a data transmission channel that corresponds to QoS and that is set up by a network for implementing differentiated data transfer. A bearer may be implemented in a manner of a data tunnel, for example, a logical data transmission channel that is based on the GPRS Tunneling Protocol (GTP) and that is set up between a source node and a destination node in data transmission. QoS control is not differentiated for data flows on a same bearer, but all the data flows have a same data packet forwarding processing manner, and data transmission is performed according to a transmission protocol corresponding to a transmission channel.

The term "reflective QoS" (Reflective QoS) in this specification means that uplink data transmission QoS is a reflection of downlink data transmission QoS. A basic idea of the reflective QoS is to determine QoS information of uplink data transmission based on QoS information of downlink data transmission.

The term "reflective QoS indication" (RQI) in this specification is indication information used to indicate whether to perform data transmission in a reflective QoS manner. If the RQI is used in downlink data transmission, the RQI may be used to indicate whether a QoS control manner consistent with that in the downlink data transmission needs to be used for corresponding uplink data transmission. The RQI is applicable to a single data flow, or aggregation of a plurality of data flows.

The term "reflective QoS attribute of a bearer" in this specification indicates whether the bearer supports reflective QoS transmission. If a bearer supports reflective QoS, a reflective QoS attribute of the bearer is Support. In this case, a network may map, to the bearer, data including a reflective QoS indication. If a bearer does not support reflective QoS transmission, a reflective QoS attribute of the bearer is Nonsupport.

The term "QoS class of a bearer" in this specification is a processing priority for each bearer when an access network device processes data corresponding to the bearer. In an example, a QoS class of a bearer may be represented in a form of a QoS class identifier (QCI).

The term "flow priority indicator" (FPI) in this specification is a processing priority for each flow when a core network device or an access network device processes data corresponding to the flow. For example, the FPI may correspond to a priority of scheduling a flow by a network upon congestion. The FPI may be an identifier similar to a QCI.

The term "bearer quality of service indicator" (BQI) in this specification is used to indicate QoS information corresponding to a bearer. When data corresponding to a bearer is processed, the BQI indicates a processing priority of data on each bearer. The BQI may be further used to indicate whether the bearer supports reflective QoS. The BQI may be further used to instruct UE how to map data to a bearer. For example, the BQI may include a data-to-bearer mapping indication, and UE may determine a bearer based on an indication of the BQI.

The term "data flow" in this specification is service-related application data generated by UE or a data network, for example, an IP flow. To transfer data to a peer end, the data needs to be transmitted through a network. The network converts higher layer data into a form suitable for transmission in the network. In a flow-based transmission mode, for data packets in a same flow, the network uses same data packet forwarding treatment (packet forwarding treatment), and uses a same QoS rule for processing. The flow-based transmission mode may include sending in a form of a flow or transmission in a form of a flow, unlike a bearer-based QoS control manner in which different data flows may be mapped to a same bearer, and QoS is not differentiated for data flows on a same bearer. A data-flow-to-bearer mapping manner may be 1:1, or may be N:1. The mapping manner may be further related to a QoS attribute of a data flow. For example, the 1:1 mapping manner is used for a guaranteed bit rate (GBR) data flow, and the N:1 mapping manner is used for a non-guaranteed bit rate (non-GBR) data flow.

Finer QoS control and a finer differentiation granularity can be achieved when transmission is performed in a data flow manner. One or more data flows may be mapped to one bearer, to reduce signaling overheads by performing transmission in a bearer manner. As more data flows are mapped to one bearer, a network needs to set up fewer bearers, and corresponding signaling overheads are smaller.

The term "QoS rule" in this specification is an information set defined based on an operator policy, an application requirement, and a QoS parameter; and is used to detect a service data flow or service data, define a QoS parameter related to the service data flow or service data, and determine a data flow transmission mode or a data transmission mode. The data flow transmission mode may include: performing transmission in a flow manner or in a bearer manner. The transmission in a flow manner may be: transmitting a data packet of a data flow according to an IP transmission protocol. The transmission in a bearer manner may be: mapping one or more data flows to one bearer for transmission.

The QoS rule may include QoS requirement information of a data flow and/or a transmission mode of a data flow, for example, to perform transmission in the bearer manner or in the data flow manner. The QoS requirement information may include a data rate, a transmission delay, and the like. The QoS rule may further include a mapping relationship between a bearer and a data flow.

The term "mapping" in this specification means mapping one or more data flows having same or similar QoS to one bearer, where each bearer corresponds to one set of QoS parameters. The QoS parameters may include a QoS class of a service, a maximum bit rate (MBR), an allocation and retention priority (ARP), and the like, and is used to identify a manner of processing, by a network, data on the bearer. A same data forwarding processing manner is used for data on a same bearer. A core network control plane (AN CP) function entity and a UE user plane function entity may map a plurality of data flows having different QoS to one or more bearers. A CN UP function entity, the AN CP function entity, and the UE user plane function entity may perform a flow demapping operation.

The term "demapping" in this specification is a reverse process of "mapping", and means demapping data on one bearer and restoring the data to different data flows. It should be noted that both a mapping process and a demapping process are optional operations, and each user plane function entity determines, according to an obtained QoS rule, whether to perform a corresponding operation.

The term "pre-granted QoS" in this specification means that a network pre-grants that data transmission of some specific services of UE corresponds to QoS at a specified class. The pre-granted-QoS may be used as a part of user subscription content. When the UE initiates the specific service, QoS grant no longer needs to be performed for the service. For example, for some users, the network may pre-grant that, when corresponding UE initiates a health monitoring service, the service directly corresponds to a relatively high QoS class. In this way, when the UE initiates a corresponding service, a network side may directly set up a dedicated bearer for the UE, but a service grant process does not need to be performed again.

The term "pre-granted QoS bearer" in this specification means that, for some data that has a pre-granted QoS attribute, a network directly sets up a corresponding bearer for such data after a session is set up, even if there is no such data to be sent in this case, thereby reducing a delay compared with setting up a bearer after data arrives.

The following describes in detail technical solutions in the embodiments of the present application by using specific embodiments. The following several specific embodiments may be combined with one another, and a same or similar concept or process may not be described repeatedly in some embodiments.

Figure 1:
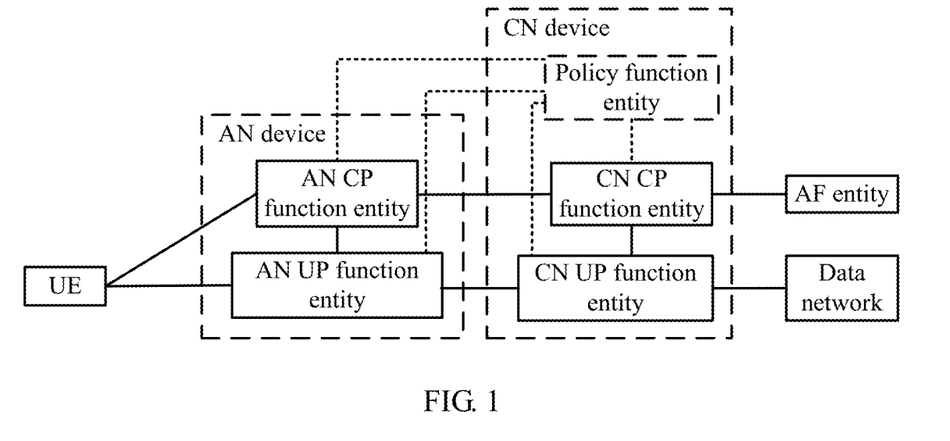
FIG. 1 is a schematic diagram of a wireless communications system according to an embodiment of this patent application.

FIG. 1 is a schematic diagram of a wireless communications system according to an embodiment of the present application. The wireless communications system includes UE, an access network (AN) device, and a core network (CN) device. The UE and the AN device are connected to each other through an air interface. The AN device and the CN device may be connected to each other in a wired or wireless manner. The UE implements a data communication service by using the AN device and the CN device.

In this embodiment of this application, the UE may also be a terminal device, an access terminal, a subscriber unit, a subscriber station, a mobile station, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device or a computing device having a wireless communication function, another processing device connected to a wireless modem, an in-vehicle device, a wearable device, a terminal device in a future 5G network, a terminal device in a future evolved public land mobile network (PLMN), or the like.

In this embodiment of this application, the AN device may be a device configured to communicate with a terminal device. The AN device may be a base transceiver station (BTS) in GSM or CDMA, a NodeB (NB) in a WCDMA system, an evolved NodeB (eNB or eNodeB) in an LTE system, or a radio controller in a cloud radio access network (CRAN) scenario. Alternatively, the AN device may be a relay station, an access point, an in-vehicle device, a wearable device, an AN device in a future 5G network, an AN device in a future evolved network, or the like. Alternatively, the AN device may be a next-generation NodeB (gNB), a transmit and receive point (TRP), a central unit (CU) device, a distributed unit device (DU) device, or the like.

In the embodiment shown in FIG. 1, the AN device includes an access network control plane (AN CP) function entity and an access network user plane (AN UP) function entity. The AN CP function entity and the AN UP function entity are connected to each other. The AN CP function entity has a QoS control function, and can control QoS processing of the AN UP function entity. Optionally, the AN CP function entity may send a QoS rule to the AN UP function entity. The AN UP function entity transmits data according to the received QoS rule.

The CN device may be a gateway, a router, a data center, a server, a network management device, or the like. In the embodiment shown in FIG. 1, the CN device includes a core network control plane (CN CP) function entity and a core network user plane (CN UP) function entity.

The CN CP function entity and the CN UP function entity are connected to each other. The CN CP function entity has a QoS control function, and can control QoS processing of the CN UP function entity. The CN CP function entity may send a QoS rule to the CN UP function entity. The CN UP function entity transmits data according to the received QoS rule.

Optionally, the CN device may further include a policy function entity. The policy function entity is configured to: define, based on user subscription information and an operator policy, a corresponding QoS control policy; and perform service QoS grant for a received QoS grant request, and the like. The policy function entity may be connected separately to the AN CP function entity and the CN CP function entity. The policy function entity is configured to send QoS grant information to the AN CP function entity and the CN CP function entity. In addition, the policy function entity may be connected separately to the AN UP function entity and the CN UP function entity, to send QoS grant information to the AN UP function entity and the CN UP function entity.

In the embodiment shown in FIG. 1, both the AN device and the CN device have logically independent QoS control functions, which are implemented by the AN CP function entity and the CN CP function entity respectively. The QoS control function of the AN CP function entity is similar to that of the CN CP function entity, but control ranges of the AN CP function entity and the CN CP function entity are different. The CN CP function entity mainly controls QoS processing of the CN UP function entity, and the AN CP function entity mainly controls QoS processing of the AN UP function entity. Resources of a core network are different from resources of an access network. The core network and the access network may flexibly implement respective QoS management functions by using different QoS control methods based on their respective resources.

In this embodiment, the AN device has a QoS management function, and can manage and control data transmission on an AN user plane, thereby improving flexibility of service QoS management in a wireless communications network and providing a possibility of independent evolution of respective QoS frameworks of the CN and the AN.

The wireless communications system may further communicate with an application function (AF) entity and a data network (DN). The AF entity may provide a data flow service having a specific QoS requirement, and is similar to an application server. The AF entity may be deployed by a network operator, or may be deployed by a third party. The data network may provide a specific type of data service, is usually an external network, and is similar to a packet data network (PDN). A type of the data network includes but is not limited to the Internet and an IP multimedia subsystem (IMS).

Figure 2:
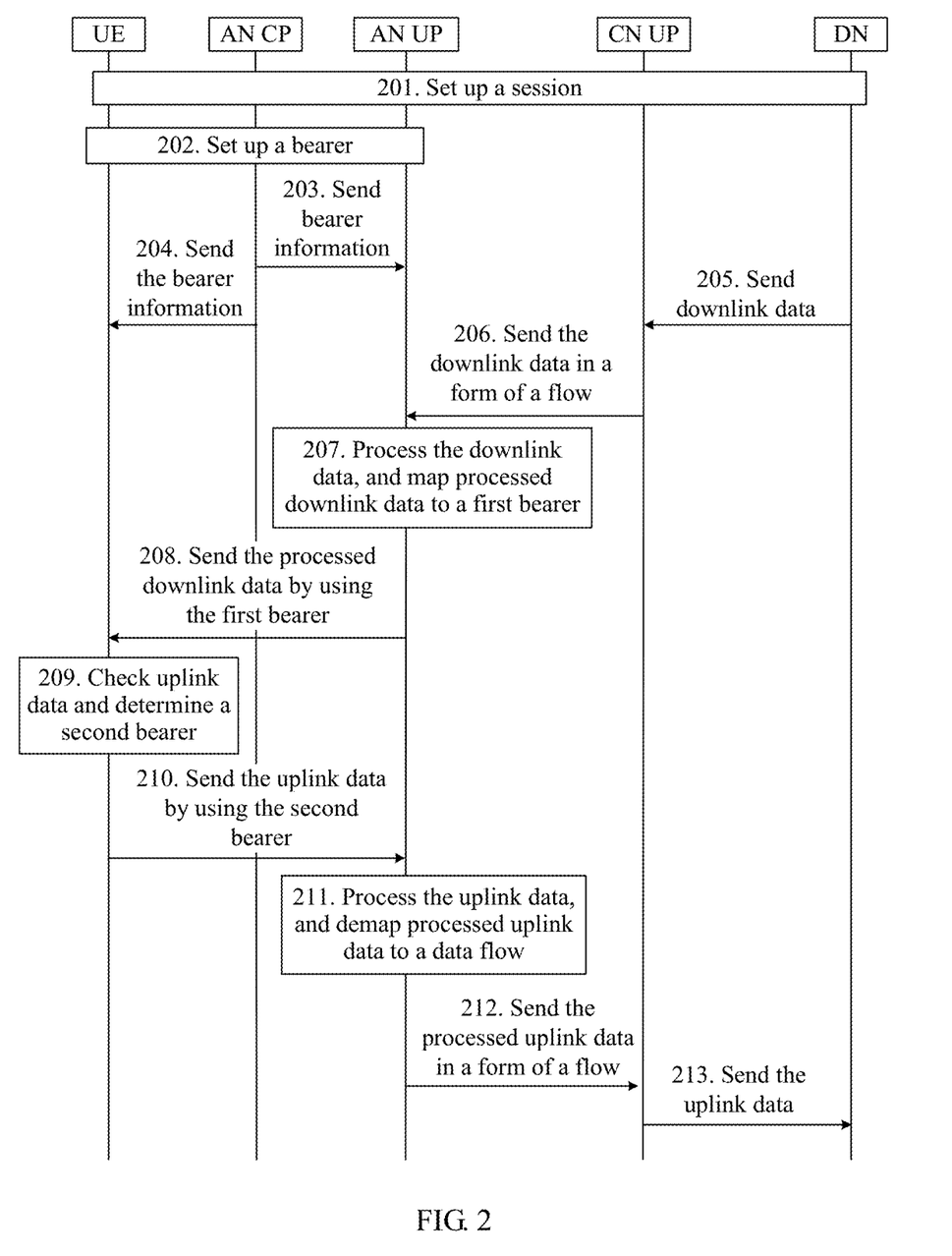
FIG. 2 is a schematic interaction diagram of a communication method according to another embodiment of this patent application.

FIG. 2 is a schematic interaction diagram of a communication method according to an embodiment of this patent application. As shown in FIG. 2, the method includes the following steps.

201. After a user successfully accesses a network, UE sets up a session with a data network through a wireless communications system. In this process, the UE obtains an identifier, such as an IP address, used for communicating with the data network. The session may be a protocol data unit (PDU) session.

202. An AN CP function entity initiates setup of a bearer between the UE and an AN UP function entity.

For some types of bearers, bearer setup may start immediately after session setup is complete but does not need to be triggered only after data arrives. The bearer in step 202 may be a default bearer or a pre-granted QoS bearer.

In a process of setting up the bearer, the AN CP function entity generates a bearer identifier, where the identifier may be used to identify the bearer. The AN CP function entity configures QoS information, such as a QoS class, for the bearer. The AN CP function entity may further allocate a corresponding network resource to the bearer based on the QoS information. The network resource may be bandwidth, a storage resource, or the like.

The AN CP function entity may further classify bearers. In an embodiment, bearers may be classified into two types: a reflective QoS enabled (RQ Enabled) bearer and a non-reflective QoS enabled (Non-RQ Enabled) bearer. The RQ enabled bearer may be used to support reflective QoS, and a reflective QoS attribute of the RQ enabled bearer is Support. The non-RQ enabled bearer cannot be used to support reflective QoS, and a reflective QoS attribute of the non-RQ enabled bearer is Nonsupport.

There may be a plurality of classification methods, as described below by using examples. In a classification method, the AN CP function entity may classify bearers that are set up. For example, assuming that 10 bearers have been set up, the bearers may be classified into RQ enabled bearers and non-RQ enabled bearers based on a specific quantity proportion. Another classification method may be a static classification method. To be specific, bearers with some specific numbers are fixedly defined as RQ enabled bearers or non-RQ enabled bearers. For example, assuming that a maximum of 10 bearers can be set up for the UE, the 10 bearers may be numbered. For simplicity, in an example, the numbers may be defined as 1, 2, 3, . . . , and 10. In the static classification method, a bearer 1 to a bearer 5 may be fixedly defined as or reserved as RQ enabled, and a bearer 6 to a bearer 10 may be fixedly defined as or reserved as non-RQ enabled. After a bearer is subsequently set up, an appropriate number is selected for the bearer based on a reflective QoS attribute of the bearer.

For data transmitted on an RQ enabled bearer, each piece of downlink data does not need to include an RQI, but the UE may directly determine, based on a type of the bearer on which the data is transmitted, that reflective QoS is to be used for corresponding uplink data. This can reduce data transmission overheads on an air interface, and improve effective data transmission efficiency of a network.

203. The AN CP function entity sends bearer information to the AN UP function entity, and the AN UP function entity receives the bearer information. The bearer information includes a bearer identifier and QoS information of a bearer. The QoS information of the bearer includes a QoS class supported by the bearer and an RQ attribute. The bearer identifier may be an identifier of the bearer set up in step 202. The QoS class supported by the bearer may be represented in a form of a QCI. The RQ attribute may be RQ Enabled or non-RQ Enabled.

204. The AN CP function entity sends the bearer information to the UE, and the UE receives the bearer information. For the bearer information, refer to the descriptions in step 203.

205. The data network sends downlink data to a CN UP function entity in a form of a data packet, and the CN UP function entity receives the downlink data.

206. The CN UP function entity processes the downlink data, to match the downlink data with a data flow. The CN UP function entity sends the downlink data to the AN UP function entity in a form of a flow. The AN UP function entity receives the downlink data. The CN UP function entity adds QoS information of the data flow to a packet header of the downlink data, where the QoS information includes an FPI and an RQI. Optionally, the CN UP function entity may further add a data flow ID to the packet header of the downlink data.

In step 206, a template-based filtering manner may be used as a matching manner. For example, a parameter group is defined, and a value or a value range is set for each parameter in the group. When a value of a related parameter of a data packet is the same as the preset value, or falls within the preset value range, the data packet may be mapped to a corresponding data flow. In an example, the parameter group may be an IP 5-tuple. The IP 5-tuple includes a destination IP address, a source IP address, a destination port number, a source port number, and a protocol type.

207. The AN UP function entity processes the received downlink data, and maps processed downlink data to a first bearer. The first bearer may be one of bearers set up in step 202.

A processing procedure of the AN UP function entity may be: obtaining, based on the downlink data received in step 206, downlink data that needs to be sent in step 208. To distinguish between the downlink data in step 206 and step 208 more clearly, the downlink data mentioned in step 208 may be referred to as first downlink data, and the downlink data mentioned in step 206 may be referred to as second downlink data. The AN UP function entity may remove the RQI from the packet header of the first downlink data. In other words, the second downlink data includes an RQI, and the first downlink data does not include an RQI. In a scenario in which an AN performs transmission by using a bearer and a CN performs transmission by using a flow, the second downlink data may further include an FPI, and the first downlink data does not include an FPI. In other words, the packet header of the first downlink data does not include an FPI or an RQI. Alternatively, the AN UP function entity may generate a new data packet header. The new data packet header may include a data flow ID. The new data packet header may also include a BQI. A manner of generating the new data packet header may be: replacing each old data packet header with the new data packet header.

When the AN UP function entity receives more than one data flow, if some data flows have a same QoS requirement or similar QoS requirements, the AN UP function entity may map the data flows to a same bearer. If the data flows each include an RQI, the bearer may be an RQ enabled bearer.

Optionally, the AN UP function entity may further record an FPI indicator of each data flow, so that in uplink data transmission, the AN UP function entity can add a corresponding FPI to a data packet header when sending uplink data to the CN UP function entity in a form of a flow.

208. The AN UP function entity sends the processed downlink data to the UE by using the first bearer, and the UE receives the downlink data by using the first bearer. The processed downlink data has neither an FPI nor an RQI, thereby saving an air interface resource. Optionally, the downlink data in this step may include a BQI. A QoS attribute of the first bearer may be further indicated to the UE by using the BQI. The BQI may be further used to instruct the UE how to map uplink data to a bearer.

209. When the UE needs to transmit uplink data, the UE checks the uplink data, and if the uplink data corresponds to the downlink data received in step 208, may determine a second bearer with reference to the first bearer used in step 208. QoS information of the second bearer is determined based on QoS information of the first bearer.

In an embodiment, that uplink data corresponds to downlink data means that the uplink data and the downlink data belong to a same service flow. One session may include a plurality of service flows, and each service flow corresponds to one service type and one QoS control manner. In another embodiment, that uplink data corresponds to downlink data means that the uplink data and the downlink data belong to a same session flow.

The QoS information of the second bearer is determined based on the QoS information of the first bearer. For example, a QoS class of the second bearer is determined based on a QoS class of the first bearer. Certainly, other QoS information of the second bearer may be alternatively determined based on corresponding other QoS information of the first bearer.

In an embodiment, the QoS class of the second bearer is the same as the QoS class of the first bearer. In other words, the QoS class of the second bearer and the QoS class of the first bearer are in a one-to-one correspondence. The QoS class of the second bearer can be directly determined based on the QoS class of the first bearer. In another embodiment, the QoS class of the second bearer corresponds to the QoS class of the first bearer. For example, a channel corresponding to an uplink bearer may be asymmetric to a channel corresponding to a downlink bearer, and bandwidth of a downlink channel is usually higher than bandwidth of an uplink channel. When a QoS class is defined, different definitions may be used in uplink and downlink. For example, a maximum bit rate of a downlink bearer may be greater than a maximum bit rate of an uplink bearer. Therefore, a QoS class of the downlink bearer may be higher than a QoS class of the uplink bearer. Therefore, when the QoS class of the uplink bearer is determined based on the QoS class of the downlink bearer, a one-to-one correspondence manner is not used, and only a correspondence between the QoS class of the uplink bearer and the QoS class of the downlink bearer is needed. With reference to the correspondence, the QoS class of the second bearer can be determined based on the QoS class of the first bearer.

It should be noted that the first bearer and the second bearer may be the same, or may be different. If the first bearer is a bidirectional bearer, the second bearer may be the same as the first bearer.

Alternatively, the second bearer may be a new bearer. For example, when the first bearer is a unidirectional bearer, or uplink data and downlink data need to be transmitted on different bearers, the UE may send a bearer setup request to the AN CP function entity, to trigger the AN CP function entity to set up a new bearer. The new bearer and the first bearer have a same QoS feature, or their QoS features correspond to each other. The new bearer is set up after the UE receives the downlink data.

If a data packet received in step 208 includes a BQI, in step 209, the UE may further determine the second bearer based on the BQI. The BQI may further include a manner of mapping a data flow to a bearer, for example, a mapping template. The UE may map an uplink data flow to an existing bearer based on an indication of the BQI.

In step 209, the UE may match the uplink data with a data flow. For a matching manner, refer to the descriptions in step 206. Then the UE maps the data flow to the second bearer. It should be noted that, alternatively, the UE may directly map the uplink data to the second bearer.

210. The UE sends the uplink data to the AN UP function entity by using the second bearer, and the AN UP function entity receives the uplink data.

211. The AN UP function entity processes the uplink data, and demaps processed uplink data to a data flow.

A processing procedure of the AN UP function entity may be: obtaining, based on the uplink data received in step 210, uplink data that needs to be sent in step 212. To distinguish between the uplink data in step 210 to step 212 more clearly, the uplink data mentioned in step 210 may be referred to as first uplink data, and the uplink data mentioned in step 212 may be referred to as second uplink data. In a scenario in which the AN performs transmission by using a bearer and the CN performs transmission by using a flow, a packet header of the first uplink data does not include an FPI, and the AN UP function entity may process the first uplink data, so that an FPI corresponding to the second uplink data is added to a packet header of the second uplink data. In other words, the second uplink data includes an FPI.

212. The AN UP function entity sends the processed uplink data to the CN UP function entity in a form of a flow, and the CN UP function entity receives the uplink data.

213. The CN UP function entity sends the received uplink data to the data network.

It should be noted that step 204 is optional. In some cases, step 204 may not be performed. For example, if the downlink data in step 208 includes a BQI and the BQI can reflect QoS information of a bearer, step 204 may be omitted.

In addition, a sequence of step 203 and step 204 is not limited. Step 203 may be performed before step 204, or step 204 may be performed before step 203, or step 203 and step 204 may be simultaneously performed.

Figure 3:
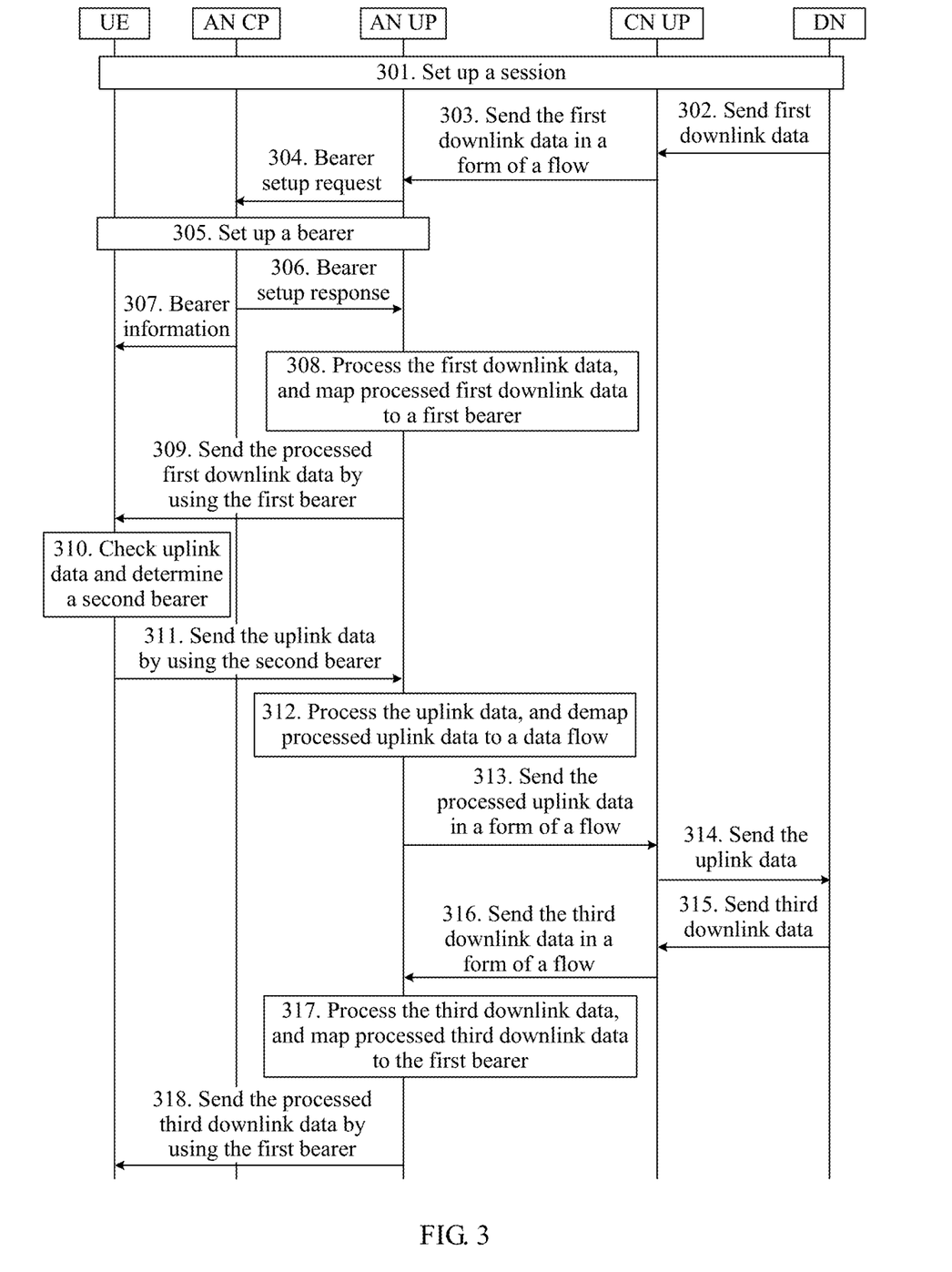
FIG. 3 is a schematic interaction diagram of a communication method according to still another embodiment of this patent application.

FIG. 3 is a schematic interaction diagram of a communication method according to another embodiment of this patent application. As shown in FIG. 3, the method includes the following steps.

301. This step is basically the same as step 201. Refer to step 201. Details are not described herein again.

302. The data network sends first downlink data to a CN UP function entity, and the CN UP function entity receives the first downlink data.

303. The CN UP function entity processes the first downlink data, to match the first downlink data with a data flow. The CN UP function entity sends the first downlink data to an AN UP function entity in a form of a flow. The AN UP function entity receives the downlink data. For this step, refer to the descriptions in step 206. Details are not described herein again.

304. The AN UP function entity sends a bearer setup request to an AN CP function entity, and the AN CP function entity receives the bearer setup request. The bearer setup request includes requested QoS information, where the requested QoS information is the same as QoS information included in the first downlink data.

305. The AN CP function entity initiates setup of a bearer between UE and the AN UP function entity. The AN CP function entity initiates the setup of the bearer between the UE and the AN UP based on the QoS information included in the bearer setup request. In this embodiment, for ease of description, the bearer set up in step 305 may be referred to as a first bearer.

In a process of setting up the bearer, the AN CP function entity generates a bearer identifier, where the identifier may be used to identify the bearer. The AN CP function entity configures a QoS parameter, such as a QoS class, for the bearer. The AN CP function entity further allocates a corresponding network resource to the bearer based on pre-granted QoS information. The network resource may be bandwidth, a storage resource, or the like.

If the QoS information of the first downlink data includes an RQI indicator, an attribute of the bearer may be identified as RQI Enabled.

306. The AN CP function entity sends a bearer setup response to the AN UP function entity, and the AN UP function entity receives the bearer setup response. The bearer setup response includes bearer information. The bearer information includes a bearer identifier and QoS information of a bearer. The QoS information of the bearer includes a QoS class supported by the bearer. The QoS information of the bearer may further include an RQ attribute. In this embodiment, the RQ attribute of the bearer set up in step 305 is RQ Enabled.

307. The AN CP function entity sends bearer information to the UE, and the UE receives the bearer information. The bearer information includes a bearer identifier and QoS information of a bearer. The QoS information of the bearer includes a QoS class supported by the bearer and an RQ attribute. In this embodiment, the RQ attribute is RQ Enabled. It should be noted that step 306 and step 307 may be simultaneously performed.

308. The AN UP function entity processes the received first downlink data, to map processed first downlink data to the first bearer. The first bearer is the bearer set up in step 305.

309. The AN UP function entity sends the processed first downlink data to the UE by using the first bearer, and the UE receives the downlink data.

310. When the UE needs to transmit uplink data, the UE checks the uplink data, and if the uplink data corresponds to the downlink data received in step 309, may determine a second bearer with reference to the first bearer used in step 309. The second bearer may be the same as the first bearer, or may be a newly set up bearer. For details, refer to the descriptions of the second bearer in step 209.

311. The UE sends the uplink data to the AN UP function entity by using the second bearer, and the AN UP function entity receives the uplink data.

312. The AN UP function entity processes the uplink data, and demaps processed uplink data to a data flow.

A processing procedure of the AN UP function entity may be: obtaining, based on the uplink data received in step 311, uplink data that needs to be sent in step 313. To distinguish between the uplink data in step 311 to step 313 more clearly, the uplink data mentioned in step 311 may be referred to as first uplink data, and the uplink data mentioned in step 313 may be referred to as second uplink data. In a scenario in which an AN performs transmission by using a bearer and a CN performs transmission by using a flow, a packet header of the first uplink data does not include an FPI, and the AN UP function entity may process the first uplink data, so that an FPI corresponding to the second uplink data is added to a packet header of the second uplink data. In other words, the second uplink data includes an FPI.

313. The AN UP function entity sends the processed uplink data to the CN UP function entity in a form of a flow, and the CN UP function entity receives the uplink data.

314. The CN UP function entity sends the received uplink data to the data network.

In the embodiment shown in FIG. 3, a definition of an RQ enabled bearer is dynamic.

A bearer set up after the AN UP function entity receives a first data flow having an RQI indicator is defined as an RQ enabled bearer, where the bearer is mapped to the first data flow. Subsequently, if the AN UP function entity receives a new data flow, and the new data flow is related to the first data flow having an RQI indicator, for example, they have a same QoS requirement or similar QoS requirements and the new data flow also includes an RQI indicator, the AN UP function entity may also map the new data flow to the RQ enabled bearer. In this embodiment of the present application, the bearer set up during transmission of the first downlink data may be retained for use in subsequent transmission. Optionally, this embodiment of the present application may further include the following steps.

315. The data network sends downlink data to the CN UP function entity, and the CN UP function entity receives the downlink data. To distinguish between the downlink data in step 315 and the downlink data in step 302, the downlink data in step 315 may also be referred to as third downlink data.

316. The CN UP function entity processes the third downlink data, to match the downlink data with a data flow. For detailed descriptions of step 316, refer to step 206.

317. The AN UP function entity processes the received third downlink data, and maps processed downlink data to the first bearer. The AN UP function entity may remove an RQI from a packet header of the downlink data, and the downlink data after being processed by the AN UP function entity does not include an RQI. In a scenario in which the AN performs transmission by using a bearer and the CN performs transmission by using a flow, a packet header of the downlink data in step 315 includes an FPI, and a packet header of the downlink data after being processed by the AN UP function entity may not include an FPI. In other words, the processed downlink data has neither an FPI nor an RQI, thereby saving an air interface resource during transmission of the downlink data. In this embodiment, if the third downlink data is related to the first downlink data, the third downlink data may also be transmitted by using the first bearer. For example, if the third downlink data and the first downlink data have a same QoS requirement or similar QoS requirements, and the third downlink data also includes an RQI indicator, the AN UP function entity may alternatively map the third downlink data to the first bearer.

318. The AN UP function entity sends the processed downlink data to the UE by using the first bearer, and the UE receives the downlink data by using the first bearer. For detailed descriptions of step 318, refer to step 208.

In this embodiment, if the UE needs to transmit uplink data, steps 310 to 314 may alternatively be performed after step 318.

This embodiment of the present application is applicable to a scenario in which the AN uses a bearer and the CN uses a data flow. The foregoing has described this scenario by using FIG. 2 and FIG. 3. It should be noted that this embodiment of the present application is also applicable to a scenario in which both the AN and the CN use a bearer, as described below.

Figure 4:
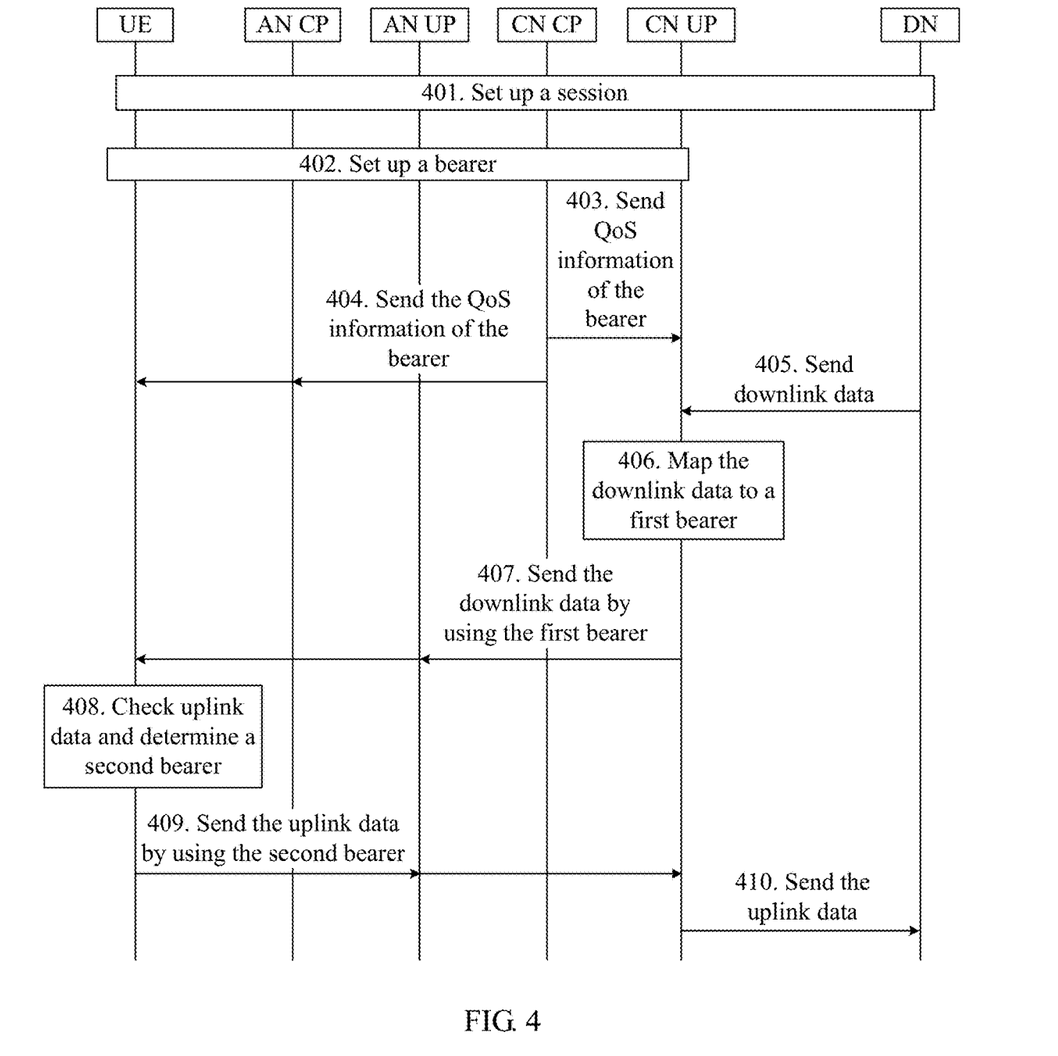
FIG. 4 is a schematic interaction diagram of a communication method according to yet another embodiment of this patent application.

FIG. 4 is a schematic interaction diagram of a communication method according to another embodiment of this patent application. As shown in FIG. 4, the method includes the following steps.

401. This step is basically the same as step 201. Details are not described herein again.

402. A CN CP function entity initiates setup of a bearer between the UE and an AN UP function entity, and a bearer between the AN UP function entity and an AN CP function entity.

For some types of bearers, bearer setup starts immediately after session setup is complete but does not need to be triggered only after data arrives. The bearer in step 202 may be a default bearer or a pre-granted QoS bearer.

In a process of setting up the bearer, the CN CP function entity generates a bearer identifier, where the identifier may be used to identify the bearer. The CN CP function entity configures QoS information, such as a QoS class, for the bearer. The CN CP function entity may further allocate a corresponding network resource to the bearer based on the QoS information. The network resource may be bandwidth, a storage resource, or the like.

The CN CP function entity may further classify bearers. In an embodiment, bearers may be classified into two types: a reflective QoS enabled (RQ Enabled) bearer and a non-reflective QoS enabled (Non-RQ Enabled) bearer. The RQ enabled bearer may be used to support reflective QoS, and a reflective QoS attribute of the RQ enabled bearer is Support. The non-RQ enabled bearer cannot be used to support reflective QoS, and a reflective QoS attribute of the non-RQ enabled bearer is Nonsupport.

There may be a plurality of classification methods, as described below by using examples. In a classification method, the CN CP function entity may classify bearers that are set up. Another classification method may be a static classification method. For details, refer to the foregoing descriptions.

403. The CN CP function entity sends bearer information to a CN UP function entity, and the CN UP function entity receives the bearer information. The bearer information includes a bearer identifier and QoS information of a bearer. The QoS information of the bearer includes a QoS class supported by the bearer and an RQ attribute. The bearer identifier may be an identifier of the bearer set up in step 402. The QoS class supported by the bearer may be represented in a form of a QCI. The RQ attribute may be RQ Enabled or non-RQ Enabled.

404. The CN CP function entity sends the bearer information to the UE, and the UE receives the bearer information. In an example, the CN CP function entity may send the bearer information to the UE through the AN CP function entity. For the bearer information, refer to the descriptions in step 403.

405. The data network sends downlink data to the CN UP function entity in a form of a data packet, and the CN UP function entity receives the downlink data.

406. The CN UP function entity maps the downlink data to a first bearer.

The first bearer may be an RQ enabled bearer. Optionally, the CN UP function entity may also add a BQI to a packet header of the downlink data.

Optionally, in step 406, the CN UP may determine whether to use a reflective QoS transmission mode for the downlink data. A determining manner may be as follows: The CN UP function entity sends a request to the CN CP function entity, and after the determining, the CN CP function entity sends a result to the CN UP function entity. The determining may be performed with reference to a service type or a service attribute. For example, for some services whose service requirements may frequently change, the reflective QoS transmission mode may be used.

407. The CN UP function entity sends the downlink data to the AN UP function entity by using the first bearer. Then the AN UP function entity sends the downlink data to the UE, and the UE receives the downlink data by using the first bearer. Optionally, the downlink data in this step may include a BQI. A QoS attribute of the first bearer may be further indicated to the UE by using the BQI. The BQI may be further used to instruct the UE how to map uplink data to a bearer.

408. When the UE needs to transmit uplink data, the UE checks the uplink data, and if the uplink data corresponds to the downlink data received in step 407, may determine a second bearer with reference to the first bearer.

It should be noted that the first bearer and the second bearer may be the same, or may be different. If the first bearer is a bidirectional bearer, the second bearer may be the same as the first bearer.

Alternatively, the second bearer may be a new bearer. For example, when the first bearer is a unidirectional bearer, or uplink data and downlink data need to be transmitted on different bearers, the UE may send a bearer setup request to the CN CP function entity through the AN CP function entity, to trigger the CN CP function entity to set up a new bearer. The new bearer and the first bearer have a same QoS feature. The new bearer is set up after the UE receives the downlink data.

If a data packet received in step 407 includes a BQI, in step 408, the UE may further determine the second bearer based on the BQI.

409. The UE sends the uplink data to the AN UP function entity by using the second bearer. Then the AN UP function entity sends the uplink data to the CN UP function entity by using the second bearer. Correspondingly, the CN UP function entity receives the uplink data.

410. The CN UP function entity sends the received uplink data to the data network.

Figure 5:
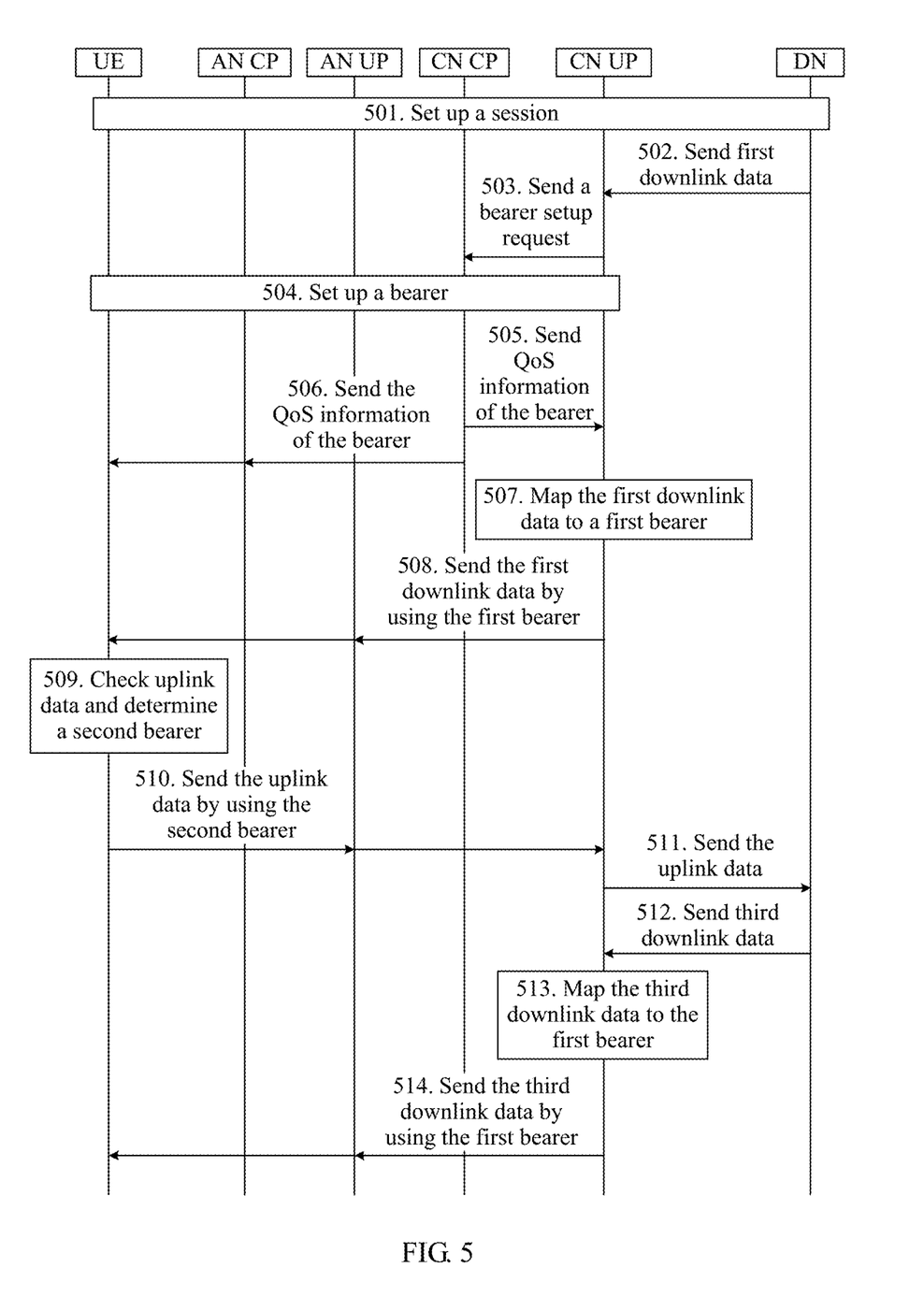
FIG. 5 is a schematic interaction diagram of a communication method according to still yet another embodiment of this patent application.

FIG. 5 is a schematic interaction diagram of a communication method according to another embodiment of this patent application. As shown in FIG. 3, the method includes the following steps.

501. This step is basically the same as step 201. Refer to step 201. Details are not described herein again.

502. The data network sends first downlink data to a CN UP function entity, and the CN UP function entity receives the first downlink data.

503. The CN UP function entity sends a bearer setup request to a CN CP function entity, and the CN CP function entity receives the bearer setup request. The bearer setup request includes requested QoS information, where the requested QoS information is the same as QoS information included in the first downlink data.

504. The CN CP function entity initiates setup of a bearer between the UE and an AN UP function entity, and between the AN UP function entity and an AN CP function entity. For this step, refer to the descriptions in step 402.

505. This step is basically the same as step 403. Details are not described herein again.

506. This step is basically the same as step 404. Details are not described herein again.

507. Map the first downlink data to a first bearer. For this step, refer to the descriptions in step 406.

508. This step is basically the same as step 407. Details are not described herein again.

509. When the UE needs to transmit uplink data, the UE checks the uplink data, and if the uplink data corresponds to the downlink data received in step 407, may determine a second bearer with reference to the first bearer.

510. This step is basically the same as step 409. Details are not described herein again.

511. This step is basically the same as step 410. Details are not described herein again.

512. This step is basically the same as step 315. Details are not described herein again.

513. If the third downlink data is related to the first downlink data, for example, the third downlink data and the first downlink data have a same QoS requirement or similar QoS requirements, and the CN UP function entity determines that reflective QoS transmission is also to be used for the third downlink data, the CN UP function entity may alternatively map the third downlink data to the first bearer.

514. This step is basically the same as step 409, except that the data transmitted on the first bearer is the third downlink data.

In this embodiment, if the UE needs to transmit uplink data, steps 509 to 511 may alternatively be performed after step 514.

It should be noted that the methods in the embodiments of the present application may be applied to the network architecture shown in FIG. 1. Certainly, the methods in the embodiments of the present application may also be applied to another type of network architecture, provided that the network architecture includes a core network device and an access network device.

In the embodiments shown in FIG. 2 and FIG. 3, to determine whether to use the reflective QoS transmission mode, the AN UP function entity may send a request to the AN CP function entity, and after the determining, the AN CP function entity sends a result to the AN UP function entity. For a basis for the determining, refer to the descriptions in the embodiment shown in FIG. 4.

In the embodiments of the present application, UE may map uplink data to a bearer by using two methods. In a first method, the UE directly maps the uplink data to the bearer. In the other method, the UE first maps the uplink data to a data flow, and then maps the data flow to the bearer.

In the embodiments of the present application, if downlink data transmitted between a core network device and an access network device includes an RQI, air interface transmission may be performed by using a bearer supporting reflective QoS. A QoS class of uplink data transmission may be determined based on a QoS class of a bearer used for corresponding downlink data transmission. The QoS class of the uplink data transmission does not need to be determined by through signaling exchange, thereby reducing signaling overheads. Alternatively, during air interface transmission, a packet header of downlink data may not carry an RQI, thereby reducing load of a data packet header and improving efficiency of effective data transmission on an air interface.

Figure 6:
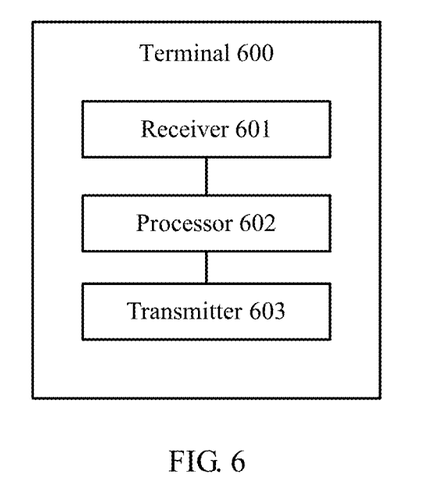
FIG. 6 is a schematic structural diagram of a terminal according to a further embodiment of the present application.

FIG. 6 is a schematic structural diagram of a terminal according to still another embodiment of the present application. As shown in FIG. 6, the terminal 600 may include: a receiver 601, a processor 602, and a transmitter 603. The receiver 601 and the transmitter 603 each are connected to the processor 602.

The receiver 601 may perform a receiving step of the UE in the foregoing method embodiments, the transmitter 603 may perform a sending step of the UE in the embodiments, and the processor 602 may perform a processing step of the UE in the embodiments, for example, a step such as checking uplink data and determining a second bearer.

Figure 7:
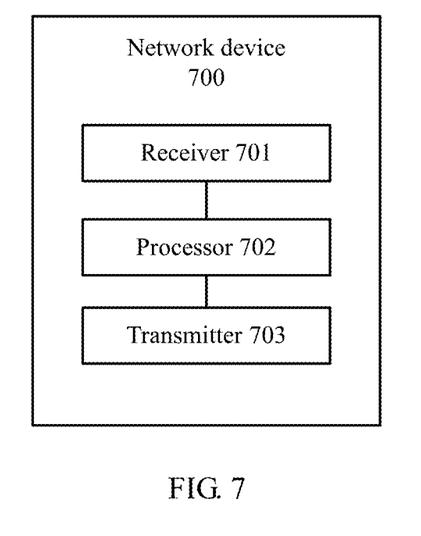
FIG. 7 is a schematic structural diagram of a network device according to a still further embodiment of the present application.

FIG. 7 is a schematic structural diagram of a network device according to yet another embodiment of the present application. As shown in FIG. 7, the network device 700 may include: a receiver 701, a processor 702, and a transmitter 703. The receiver 701 and the transmitter 703 each are connected to the processor 702.

The network device 700 may include an access network device, for example, may include an access network user plane device (corresponding to the access network user plane function entity in the foregoing descriptions). When the network device 700 includes an access network user plane device, the receiver 701 may perform a receiving step of the access network user plane function entity in the foregoing method embodiments, the transmitter 703 may perform a sending step of the access network user plane function entity in the embodiments, and the processor 702 may perform a processing step of the access network user plane function entity in the embodiments, for example, steps such as processing downlink data and mapping processed downlink data to a first bearer, and processing uplink data and demapping processed uplink data to a data flow.

The network device 700 may further include a core network device, for example, may include a core network user plane device (corresponding to the core network user plane function entity in the foregoing descriptions). When the network device 700 includes a core network user plane device, the receiver 701 may perform a receiving step of the core network user plane function entity in the foregoing method embodiments, the transmitter 703 may perform a sending step of the core network user plane function entity in the embodiments, and the processor 702 may perform a processing step of the core network user plane function entity in the embodiments, for example, a step such as mapping downlink data to a first bearer.

In the several embodiments provided in this application, it should be understood that the disclosed systems, apparatuses, and methods may be implemented in other manners. For example, the described apparatus embodiments are merely examples. For example, the unit division is merely logical function division and there may be other division manners in actual implementation. For example, a plurality of units or components may be combined or integrated into another system, or some features may be ignored or not performed. In addition, the shown or discussed mutual couplings or direct couplings or communication connections may be indirect couplings or communication connections through apparatuses or units, and may be implemented in electrical, mechanical, or other forms.

The units described as separate parts may or may not be physically separated, and parts shown as units may or may not be physical units, that is, may be located in one position, or may be distributed on a plurality of network units. Some or all of the units may be selected according to actual needs to achieve the objectives of the solutions of the embodiments.

In addition, function units in the embodiments of this patent application may be integrated into one processing unit, or each of the units may exist alone physically, or two or more units may be integrated into one unit.

When functions are implemented in a form of a software function unit and sold or used as an independent product, the functions may be stored in a computer readable storage medium. Based on such an understanding, the technical solutions of this patent application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods in the embodiments of this patent application. The storage medium includes any medium that can store program code, such as a USB flash drive, a removable hard disk, a read-only memory (ROM), a random access memory (RAM), a magnetic disk, or an optical disc.

The foregoing descriptions are merely specific implementations of this patent application, but are not intended to limit the protection scope of this patent application. Any variation or replacement readily figured out by a person skilled in the art within the technical scope disclosed in this patent application shall fall within the protection scope of this patent application. Therefore, the protection scope of this patent application shall be subject to the protection scope of the claims.

What is claimed is:

1. A method, comprising:
receiving, by user equipment, bearer information from a control plane device, the bearer information including bearer information of a plurality of bearers, wherein, for each bearer of the plurality of bearers, the bearer information of the respective bearer includes a bearer identifier and quality of service (QoS) information of the respective bearer, and the QoS information of the respective bearer includes a QoS class of the respective bearer and a reflective QoS attribute of the respective bearer, and wherein the plurality of bearers includes at least one bearer for which a reflective quality of service (QoS) attribute is Support and at least one bearer for which the reflective QoS attribute is NonSupport;
receiving, by user equipment, first downlink data associated with a first data flow through a first bearer of the plurality of bearers, wherein a reflective QoS attribute of the first bearer is Support;
when the user equipment determines to send, to an access network device, uplink data corresponding to the first downlink data, determining, by the user equipment according to the reflective QoS attribute of the first bearer being Support, that reflective QoS will be used to send the uplink data;
in response to determining that reflective QoS will be used to send the uplink data, determining, by the user equipment, a second bearer to use to send the uplink data according to QoS information of the first bearer and QoS information of the second bearer; and
sending, by the user equipment, the uplink data through the second bearer.

2. The method according to claim 1, wherein:
the second bearer is the same as the first bearer.

3. The method according to claim 1, wherein a bearer quality of service indicator (BQI) in the first downlink data indicates to use reflective QoS to send uplink data corresponding to the first downlink data.

4. The method according to claim 1, further comprising:
after receiving the first downlink data, sending, by the user equipment, a bearer setup request; and
receiving, by the user equipment, bearer information of the second bearer in response to the bearer setup request.

5. User equipment, comprising:
a receiver, configured to:
receive bearer information from a control plane device, the bearer information including bearer information of a plurality of bearers, wherein, for each bearer of the plurality of bearers, the bearer information of the respective bearer includes a bearer identifier and quality of service (QoS) information of the respective bearer, and the QoS information of the respective bearer includes a QoS class of the respective bearer and a reflective QoS attribute of the respective bearer, and wherein the plurality of bearers includes at least one bearer for which a reflective QoS attribute is Support and at least one bearer for which the reflective QoS attribute is NonSupport; and receive first downlink data through a first bearer of the plurality of bearers, wherein a reflective QoS attribute of the first bearer is Support;

a processor;

a non-transitory computer-readable storage medium storing a program to be executed by the processor, the program including instructions for:

when uplink data corresponding to the first downlink data is to be sent to an access network device, determining, according to the reflective QoS attribute of the first bearer being Support, that reflective QoS will be used to send the uplink data;

in response to determining that reflective QoS will be used to send the uplink data, determining a second bearer, wherein the second bearer is determined according to QoS information of the first bearer and QoS information of the second bearer; and a transmitter, configured to send the uplink data through the second bearer.

6. The user equipment according to claim 5, wherein:
the second bearer is the same as the first bearer.

7. The user equipment according to claim 5, wherein the program further includes instructions for:

after receiving the first downlink data, sending a bearer setup request; and receiving bearer information of the second bearer in response to the bearer setup request.

8. A non-transitory computer-readable medium storing computer instructions for execution by one or more processors, wherein the computer instructions instruct the one or more processors to:

receive bearer information from a control plane device, the bearer information including bearer information of a plurality of bearers, wherein, for each bearer of the plurality of bearers, the bearer information of the respective bearer includes a bearer identifier and quality of service (QoS) information of the respective bearer, and the QoS information of the respective bearer includes a QoS class of the respective bearer and a reflective QoS attribute of the respective bearer, and wherein the plurality of bearers includes at least one bearer for which a reflective QoS attribute is Support and at least one bearer for which the reflective QoS attribute is NonSupport;

receive first downlink data associated with a first data flow through a first bearer of the plurality of bearers, wherein a reflective QoS attribute of the first bearer is Support;

when determining to send, to an access network device, uplink data corresponding to the first downlink data, determine, according to the reflective QoS attribute of the first bearer being Support, to use reflective QoS to send the uplink data;

in response to determining that reflective QoS will be used to send the uplink data, determine a second bearer to use to send the uplink data according to QoS information of the first bearer and QoS information of the second bearer; and send the uplink data through the second bearer.

9. The non-transitory computer-readable medium according to claim 8, wherein:
the second bearer is the same as the first bearer.

10. The non-transitory computer-readable medium according to claim 8, wherein a bearer quality of service indicator (BQI) in the first downlink data indicates to use reflective QoS to send uplink data corresponding to the first downlink data.

11. The non-transitory computer-readable medium according to claim 10, wherein the BQI is included in a packet header of the first downlink data.

12. The non-transitory computer-readable medium according to claim 10, wherein the BQI further includes a data-to-bearer mapping indication.

13. The non-transitory computer-readable medium according to claim 8, wherein the computer instructions further instruct the one or more processors to:

after receiving the first downlink data, send a bearer setup request; and receive bearer information of the second bearer in response to the bearer setup request.

14. The non-transitory computer-readable medium according to claim 8, wherein a packet header of the first downlink data does not include a flow priority indicator (FPI) or a reflective QoS indication (RQI).

* * * * *